Figure 1:
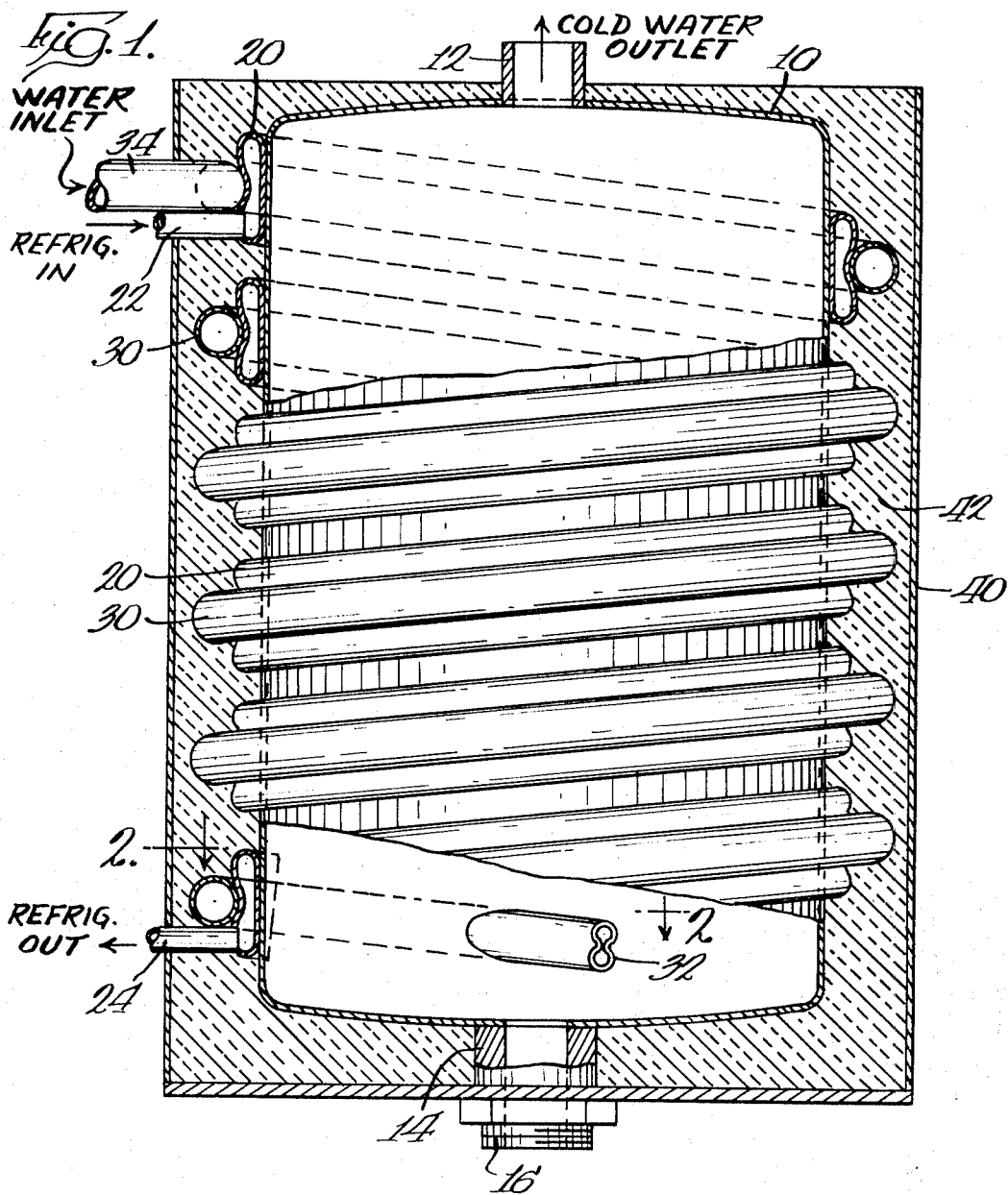

United States Patent [19]
Whalen

[11] 3,739,842
[45] June 19, 1973

[54] WATER COOLER HEAT EXCHANGER
[75] Inventor: James M. Whalen, Glenview, Ill.
[73] Assignee: Remcor Products Company, Chicago, Ill.
[22] Filed: May 12, 1971
[21] Appl. No.: 142,637

[52] U.S. Cl.................. 165/164, 62/395, 62/399, 165/169
[51] Int. Cl................................................ F28d 7/00
[58] Field of Search........................... 165/169, 164; 62/394, 399, 395, 396

[56] References Cited
UNITED STATES PATENTS

| | | | |
|---|---|---|---|
| 2,010,504 | 8/1935 | Askin | 62/395 X |
| 2,704,657 | 3/1955 | Taylor | 62/394 X |
| 2,042,418 | 5/1936 | Askin | 62/395 |
| 2,063,002 | 12/1936 | Smith | 62/394 |
| 2,650,801 | 9/1953 | Collito | 165/169 X |

FOREIGN PATENTS OR APPLICATIONS

| | | | |
|---|---|---|---|
| 829,103 | 2/1960 | Great Britain | 165/164 |
| 1,110,041 | 4/1968 | Great Britain | 62/399 |

Primary Examiner—Albert W. Davis, Jr.
Attorney—Gary, Parker, Juettner, Pigott & Cullinan

[57] ABSTRACT

Heat exchanger apparatus employed in devices such as water coolers for chilling and dispensing drinking water is improved by the combination of a storage tank for chilled water, a refrigerant coil encircling said tank for maintaining the water therein cool, and a water supply coil leading to said tank and encircling said refrigerant coil in heat exchange relation therewith for pre-cooling the water as it is supplied to said tank; and the particular combination of said coils.

2 Claims, 2 Drawing Figures

Inventor
James M. Whalen
By Gary Parker,
Juettner, Pigott & Cullinan
Attys

WATER COOLER HEAT EXCHANGER

SUMMARY OF THE INVENTION

Water coolers for chilling and dispensing drinking water, whether of the fountain or spigot type, and other similar devices, are required to have a large output capacity of water chilled to 40° to 50° F., which requires use of a tank or reservoir of pre-chilled water of a capacity adequate to satisfy the demand together with refrigeration apparatus for cooling the water to and maintaining it at 40° to 50° F.

In most instances heretofore, the water has simply been fed into a refrigerated tank of relatively large capacity and the water has been chilled simply by virtue of predetermined elapsed storage time in the tank.

The present invention provides a combined heat exchanger and reservoir characterized by a refrigerant coil having convolutions encircling a reservoir in heat exchange relation therewith and a water supply coil leading to the reservoir and having convolutions in physical union with the convolutions of the refrigerant coil whereby the water is pre-cooled on its way into the reservoir. In this way, I obtain maximum utilization of the cooling capacity of the refrigerant coil and so enhance the heat exchange relationship that I can provide up to a 60 percent reduction in the size of the reservoir for a given rate of demand for chilled water.

The invention particularly provides a heat exchanger comprising a refrigerant coil having convolutions which are generally elongate in cross section and each have a concave surface portion, and a liquid coil having convolutions each having a convex surface portion, the convolutions of the two coils being co-extensive and in physical union with one another with the convex surfaces of the liquid coil being nested within the concave surfaces of the refrigerant coil. Also, the opposite surface of each convolution of the refrigerant coil is flat so as to engage flush against the reservoir. In this manner, the refrigerant coil has large surface area contact with both the reservoir and the liquid inlet coil, whereby to provide maximum heat exchange efficiency with both.

Other features and advantages of the invention will become apparent from the detailed description, as taken in conjunction with the accompanying drawing.

THE DRAWING

Figure 2:
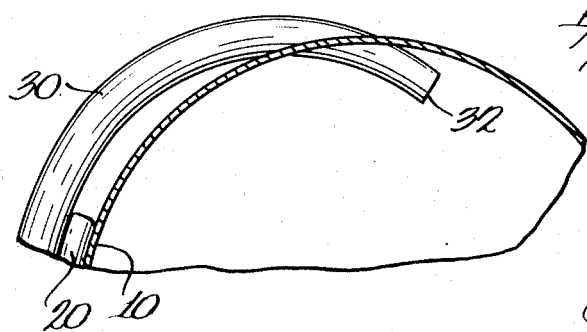

FIG. 1 is a vertical section of a water cooler heat exchanger provided pursuant to the invention; and FIG. 2 is a fragmentary horizontal section taken substantially on line 2-2 of FIG. 1.

DESCRIPTION

For the purpose of acquainting those skilled in the art with the manner of making and using my improved heat exchanger, I have shown and will now describe the embodiment thereof presently deemed to be the best mode of carrying the invention into practice.

As shown, the heat exchanger comprises a cylindrical water storage tank or reservoir 10 having an outlet 12 at its upper end which may be connected by hose or piping in any conventional manner to a drinking fountain or glass filling spigot. Also, the tank is preferably equipped at its bottom with a drain 14 normally closed by a plug 16.

Encircling the tank in heat exchange relationship therewith is a refrigerant coil 20 having refrigerant supply and return conduits 22 and 24 adjacent its opposite ends. The coil is comprised of a plurality of spiral convolutions each of which is flattened out or elongated in the direction parallel to the cylindrical wall of the tank 10. Each convolution has a flat inner surface engaging flush against the wall of the tank, thereby to have large area contact between each convolution and the tank. Preferably, each convolution is soldered or brazed into physical union with the tank to further enhance the heat exchange relationship between the two.

The outer surface of each convolution of the coil 20 is concave as shown, whereby to receive therewithin a complemental convex surface portion of a water inlet coil 30. The coil 30 may be formed simply of conventional round tubing and is comprised of a plurality of spiral convolutions of the same number and pitch as the convolutions of the coil 20, whereby the convolutions of the two coils are co-extensive and in physical union with one another throughout their lengths. By virtue of the complimental concavity and convexity of the surface of the coils, and the interfitting thereof, the convolutions of the two coils have large area contact between them. Further to enhance the heat exchange relationship, the convolutions of the two coils may be brazed or soldered into physical union with one another.

At its lower end, the water inlet coil 30 projects through the wall of the tank 10 to introduce water into the lower end portion of the tank or reservoir. As shown in FIGS. 1 and 2, the end of the tube 30 extends tangentially into the tank adjacent the cylindrical wall thereof and the tube end is swaged down to provide a restriction forming a high velocity water inlet 32 to the tank. Water thus will be injected into the tank at high velocity tangential to the cylindrical wall whereby to produce a swirling motion or centrifugal jetting of the water in the tank, causing the water to perform a wiping action against the wall. This in turn increases the heat transfer rate and eliminates occurrence of water stagnation areas in the tank.

At its upper end, the tube forming the coil 30 includes an inlet or supply portion 34 extending generally radially of the tank 10, which may be connected by hose or piping in any conventional manner to a source of water supply.

In FIG. 1, I have illustrated a refrigerant inlet 22 leading to the upper end of the coil 20 and a refrigerant outlet 24 leading from the lower end of the coil, so as to provide maximum cooling adjacent the upper end or outlet of the reservoir 10. However, it will be appreciated by those skilled in the art that refrigerant flow through the coil 20 may take place in either direction. Also, it will be understood that the materials of construction of the tank and the two coils are so selected as to provide resistance to corrosion and high thermal conductivity.

In addition to providing large area contact with the tank 10 and the coil 30, the flattening or elongating of the refrigerant coil 20 reduces the cross-sectional area of the refrigerant passage which increases refrigerant velocities and thereby maintains a high thermal transfer rate for a given refrigerating capacity.

By virtue of the described features of this invention, substantial reductions are effected in both the size and cost of water cooler heat exchangers. For example, in a water cooler having a demand rating of ½ gallon per minute of water at 50° F., with the incoming water supplied at 80° F., I accomplish a 25° F. cooling of the water during its passage through the coil 30 and require a water reservoir 10 only 40 percent the size of water reservoirs heretofore required for such service.

To complete my improved heat exchanger and reservoir combination, I preferably mount the same within a protective shell or box 40 and fill the space between the shell and the unit with a thermal insulating medium 42 such as foam, which serves both to insulate the reservoir and the coils and to protect the same from physical damage.

Thus, it will be appreciated that the objects and advantages of this invention are attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. Apparatus for cooling liquid comprising a tank for containing said liquid and having a cylindrical outer surface, a first hollow coil having convolutions elongated in a direction parallel to the axis of the coil and having a generally flat inner surface engaging the cylindrical surface of said tank and a generally concave outer surface, means for circulating coolant in said first coil, a second hollow coil comprising an inlet, an outlet, and convolutions which are coextensive with the convolutions of the first coil and having a convex inner surface fitting within and contacting said concave outer surface of said first coil, means for supplying the inlet of said second coil with said liquid, the outlet of said second coil being disposed within said tank and being directed generally tangential to the inner wall thereof.

2. The apparatus of claim 1 wherein the outlet of said second coil is restricted to cause a jet flow of liquid into said tank.

* * * * *